United States Patent
Bonafin et al.

(10) Patent No.: US 10,724,396 B2
(45) Date of Patent: Jul. 28, 2020

(54) METHOD FOR THE CALCULATION OF THE WORKING FLUID LOSS IN AN ORGANIC RANKINE CYCLE PLANT

(71) Applicant: TURBODEN SPA, Brescia (IT)

(72) Inventors: Joseph Bonafin, Brescia (IT); Isaia Casali, Brescia (IT); Marco Del Carria, Brescia (IT); Pietro Girardi, Brescia (IT)

(73) Assignee: Turboden S.p.A., Brescia (IT)

( * ) Notice: Subject to any disclaimer, the term of this patent is extended or adjusted under 35 U.S.C. 154(b) by 339 days.

(21) Appl. No.: 15/742,098

(22) PCT Filed: Jun. 23, 2016

(86) PCT No.: PCT/IB2016/053746
§ 371 (c)(1),
(2) Date: Jan. 5, 2018

(87) PCT Pub. No.: WO2017/006205
PCT Pub. Date: Jan. 12, 2017

(65) Prior Publication Data
US 2018/0202314 A1 Jul. 19, 2018

(30) Foreign Application Priority Data
Jul. 6, 2015 (IT) .................. 102015000030267

(51) Int. Cl.
| | |
|---|---|
| *F01D 21/00* | (2006.01) |
| *F01K 25/08* | (2006.01) |
| *F01K 13/00* | (2006.01) |
| *G01F 23/00* | (2006.01) |

(52) U.S. Cl.
CPC .......... *F01D 21/003* (2013.01); *F01K 13/003* (2013.01); *F01K 25/08* (2013.01); *G01F 23/00* (2013.01); *F05D 2260/602* (2013.01); *F05D 2260/606* (2013.01)

(58) Field of Classification Search
CPC ....... F01D 21/003; F01K 13/003; F01K 25/08
USPC .......................................................... 73/149
See application file for complete search history.

(56) References Cited

U.S. PATENT DOCUMENTS

2011/0174067 A1* 7/2011 Boiarski ............... A61F 5/4404
73/149

* cited by examiner

*Primary Examiner* — Tarun Sinha
(74) *Attorney, Agent, or Firm* — R. Ruschena Patent Agent, LLC

(57) ABSTRACT

Method for the calculation of the working fluid loss in an organic Rankine cycle plant, comprising at least one evaporator (1), a preheater (5), a turbine (2), a condenser (3), a pump (4), a collecting well (7) and a process piping (8), wherein said working fluid, when the plant is stopped, is in part present in known volumes inside the plant and partly drained in at least a storage tank (6) comprising at least three rooms or volumes: —a first volume (Vck) for storing the fluid to be measured, —a second volume (Vc) having a restricted section for measuring the volume of fluid stored in said first volume (Vck), —a third volume (Vckd) containing the portion of the fluid already measured, wherein, in said method, the working fluid loss of the plant is calculated as the difference between the fluid amount measured in two different instants of time.

14 Claims, 1 Drawing Sheet

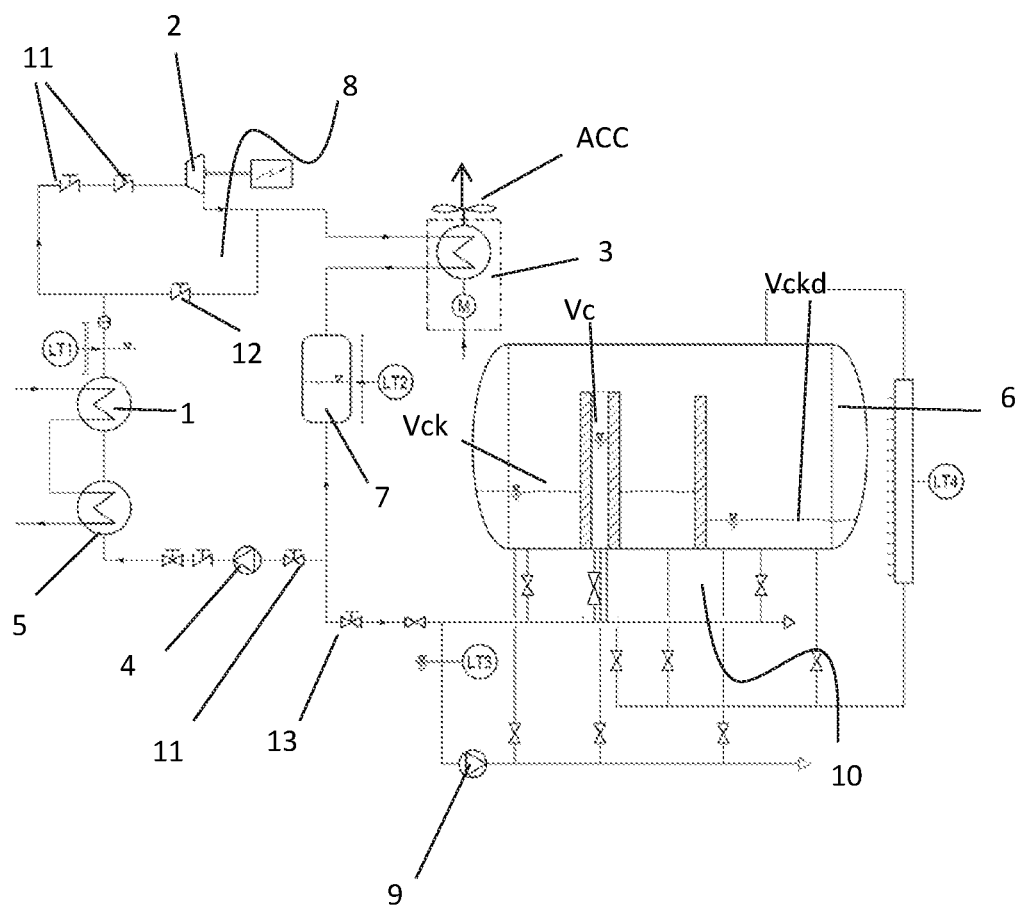

METHOD FOR THE CALCULATION OF THE WORKING FLUID LOSS IN AN ORGANIC RANKINE CYCLE PLANT

BACKGROUND OF THE INVENTION

1. Field of the Invention

The present invention relates to a method for the calculation of the working fluid loss in an Organic Rankine cycle plant (hereinafter, also ORC cycle) in a fixed period of time. In particular, the working fluid loss in a fixed period of time is calculated as a differential measurement of the amount of the working fluid contained in the plant.

2. Brief Description of the Prior Art

As it is known and in brief, a traditionally working fluid used in a Rankine cycle plants of thermal power plant is water, due to its favorable properties in high temperature applications and wherein the powers involved are considerable. In plants for the use of the heat at relatively low temperatures, the water loses its thermo-electric conversion potential, resulting more suitable than many other type of organic fluids, such as the light hydrocarbons and the hydrofluorocarbons (refrigerants). The execution of a Rankine thermodynamic cycle operated by a suitable fluid (working fluid) in a suitable machine or plant (power plant) constitutes the most common method to achieve, as a useful effect, the transformation of thermal energy into mechanical/electric energy. The conveniently use of energy sources for the production of electrical energy such as biomass, or geothermal sources, is not simple; In fact, traditional solutions such as the water-steam cycles (that are appropriated for powers higher than 2-3 MW) are penalized in plant with lower powers due to the efficiency decrease of turbomachines and to the complexity of the system itself.

In order to take good advantages of heat sources with variable and not very high temperature, it is necessary to resort to working fluids with certain properties, such as low boiling point and limit curves which are well adapted to the water sources temperature variations.

One of the drawback that can be find in ORC plants, as described above, is the working fluid losses during the plant operation.

European rules also may, in the future, require the measurement (quantity by weight) of the annual organic working fluid losses (which may contribute to the greenhouse effect, or GWP); for example, the current rules, applied to the HVAC refrigeration unit, provide limits to the annual loss for a maximum rate of 1% on the total fluid amount.

In an ORC plant, it is not practical nor precise to continuously and directly measure, the physiological working fluid loss and quantify the total loss in a particular period of time. In fact, known losses detection systems, currently used on ORC plants, are not functional for this purpose, not providing sufficiently reliable quantitative values.

SUMMARY OF THE INVENTION

Therefore, a method for the detection and measurement of working fluid losses, which can take place in different areas of a ORC plant, based on a differential measurement of the total working fluid amount ("inventory") in two different times, is really needed.

This method is the most reliable for measuring the effective working fluid loss in a time interval. It is an aspect of the present invention a method for the calculation of the working fluid loss in an organic Rankine cycle plant with a differential measurement, according to the attached independent method claim.

The indirect measurement, on the contrary of direct measuring methods, allows to obtain the required accuracy. It is then required the realization of a method for the precise measurement of the differential amount of the working fluid inside a geothermal ORC plant and the structural losses (physiological), in two successive instants of time.

An aspect of the invention is therefore a method of measuring the differential amount of fluid able to guarantee the necessary accuracy (error laid about 0.1% of the total quantity), being at the same time suitably fast (total of ~3-5 hours, depending on the volumes to be drained) to keep the stop of the plant to acceptable time levels.

According to a further aspect, an Organic Rankine cycle plant, comprising at least an evaporator, a turbine, a condenser, a pump, a preheater, a collecting well, a process piping and a storage tank, is configured to operate said calculation method of organic fluid losses.

The dependent claims describe further advantageous details and aspects of the invention.

According to a preferred embodiment, the method for the calculation of the working fluid loss as a measure of the fluid differential amount between two successive instants of time in the organic Rankine cycle plant. The measurement of the working fluid amount is performed through the following sequence steps, in a first predetermined instant of time:

a) activation of the by-pass for the hot source;
b) ramp activation of the turbines by-pass;
c) achievement of the complete turbine by-pass; d) filling of the preheater and of the evaporator up to a measured level that identifies a known volume, stopping of the pump and closing of the shut-off valve downstream of the pump and simultaneously closing of the turbine by-pass and the inlet valves;
e) drainage of the liquid contained in the condenser up to the storage tank, until it reaches a known level value in the collection well;
f) in the storage tank therefore it proceeds with an accurate measurement of the quantity of fluid contained in a control volume.

In a second time instant (spacing many days from the first time instant according to what is required) steps a-f are repeated. The difference between the two measurements represents the value of the working fluid loss.

It is observed that in presence of different fluid temperatures in the two time instants it is necessary to apply a correction based on the fluid density at those temperatures in order to correctly estimate the fluid mass based on the volumetric measurement that is carried out.

An advantage of this embodiment resides in the fact that the method of measuring the differential quantity of the working fluid is achieved with a minimum time of the plant shutdown. In fact, steps a, b and c are cooling phases of the working fluid, so that the fluid is brought to the environment temperature as soon as possible. Basically, the plant substantially proceeds in by-pass, without using the hot source, until a pressure difference between the condenser and the hot exchangers does exist. In this way the method implementation requires several hours, rather than few days.

According to a preferential embodiment said method comprises a level sensor LT1 positioned on the evaporator, in a section with a known geometry and a level sensor LT2 positioned in the collection well, which constitute a first and a second set-point of the liquid level inside the plant. An advantage of this embodiment consists in the free surface positioning of the fluid in known volumes and with restricted section.

Furthermore, a level sensor is positioned in the control volume of the storage tank to measure the liquid level in the control volume, as will be better described below.

An advantage of this embodiment consists in an accurate measurement of the liquid volume, which is loss between two successive time instants.

BRIEF DESCRIPTION OF DRAWINGS

The different embodiments are now described, by way of examples, with reference to the attached drawings in which FIG. 1 represents an ORC plant with the indication of the position of the level sensors and the drainage system.

DETAILED DESCRIPTION OF THE PREFERRED EMBODIMENTS

With reference to FIG. 1, a ORC plant scheme is represented, said plant comprising:
- an evaporator 1 where the pressurized fluid is heated and vaporized or brought to supercritical conditions by using the heat of an external source (i.e. a geothermal source);
- an expander (turbine) 2 where the expanding fluid (ideally in an isentropic way) yields outside the useful work of the cycle;
- a condenser 3, water or air refrigerated type, wherein the heat released is removed from the working fluid;
- a collecting well 7, where is collected the liquid condensed in the condenser; —a pump 4, where the liquid is pressurized from the condenser pressure to the evaporator pressure and where the negative work of the cycle is exchanged (ideally in a isentropic way);
- a pre-heater 5 that, for example using the same geothermal energy source, provides heat to the working fluid, bringing it to a temperature close to the vaporization temperature;
- a storage tank 6, which may contain the organic working fluid.

The method consists of the following chronological steps. The plant must be stopped to perform the first quantitative fluid measurement present in the plant through the following steps in sequence:
a) activation of a by-pass of the geothermal source;
b) ramp activation of the by-pass 12 of the turbine 2, being activated the fans of the air cooled condenser (ACC); reduction according to the loading ramp of the pump to the normal ORC stop (time ~30');
c) the achievement of the full by-pass 12 of the turbine 2; the working fluid reaches the balance at environment temperature (time ~30') and its temperature is measured;
d) by means of the pump, the preheater 5 and the evaporator 1 are completely filled with liquid up to a level corresponding to a known volume, when a dedicated level sensor (LT1), positioned on the evaporator and in a restricted and known section, stops the pump and closes the shut-off valve downstream of the pump (~60'); at the same time the by-pass 12 of the turbine and the inlet valves 11 are closed;
e) the drain valves 13 of the circuit and in particular the ACC air condensers are opened to drain the liquid present in the well 7 with a suitable exhaust pump. The pump drains the liquid until a predetermined set-point level (LT2) of the collecting well 7 (which is also positioned in a restricted and known section) has been reached;
f) making the measurement starting from a condition in which the working fluid is in the hot exchangers 1, 5 at a first level LT1 and occupy a known volume V1 and a working fluid is in the collecting well 7 at a second level LT2 occupy a known volume V2; when the system temperature is in equilibrium with the environment temperature, most of the 80% of the liquid is contained in known volumes V1 and V2 and the whole vapor fraction is also contained in a known volume; the liquid volume contained in the storage tank 6 is the only part to be measured.

The storage tank 6 is composed of three rooms or connecting volumes, through the vapor phase. These rooms are:
- a volume of fluid Vck drained from the process and to be measured,
- a volume Vckd used to hold the measured fluid
- a control or measurement volume Vc, the latter having much smaller volume than the first two volumes to have a smaller uncertainty of the measurement.

The loss measurement between an initial measurement and a subsequent measurement takes place starting from a configuration in which the process fluid is in the hot exchangers at LT1 level and in the collection well at LT2 level and in which all of the residual liquid phase is moved into the volume Vck (to be measured), including the liquid phase contained in the volume Vckd, according to the following phases:
1. Volume Vckd must be initially drained with the pumps 9 (the fluid in volume Vckd is moved in volume Vck)
2. fluid displacement from the volume Vck to the volume Vc; when the volume Vc is fully occupied, the fluid overflows and returns to the volume Vck; the level detected by the sensor LT4 in this case remains unchanged and thus there is the certainty that the entire Vc volume has been busy;
3. displacement of the liquid phase contained in the volume Vc to the volume Vckd by means of the drainage pump 9 until the state of low level LT3 of the pump is reached;
4. repeating the steps 2, 3 and 4 for a predetermined number of times (n) until the level in the Vck volume reaches zero and the state level LT3 of the drainage pump 9 indicates the absence of fluid in the drainage circuit 10; the volume n×Vc (known volume) will be moved in the volume Vckd and will have a residual fraction of fluid inside the volume Vc measured by the sensor LT4.

The measurement made through the phases 2, 3 and 4 will be equal to the volume:

$$n \times Vc + Vc'$$

where
n=number of emptying cycles of volume Vc which are carried on
Vc'=residual volume of fluid inside the volume Vc, measured with the sensor LT4 after a certain interval of time from the initial one.

The inventory of total fluid (total mass=Mtot) is then obtained by the formulas:

$$M_{tot,initial} = [V_{mis} * \rho_{liq} + (V_{tot} - V_{mis}) \cdot \rho_{vap}]_{initial}$$

Where:
$V_{mis} = V1 + V2 + n*Vc + Vc'$
$V_{tot}$ is the total volume of the plant, including the storage tank
$\rho_{liq}$ and $\rho_{vap}$ are the working fluid densities in liquid or vapor form at the initial temperature.

The measurement made at a later time (for example after few months), performed in the same manner and conditions, will result in the fluid inventory value:

$$M_{tot,final} = [V_{mis} * \rho_{liq} + (V_{tot} - V_{mis}) \cdot \rho_{vap}]_{final}$$

The density values will be corrected on the basis of the new temperature recorded. The loss is thus represented by the difference between $M_{tot,\ initial}$ and $M_{tot,\ final}$, and the percentage loss is obtained as:

$$100 \cdot (M_{tot,initial} - M_{tot,final}) / M_{tot,initial} = 100 \cdot \Delta m / M_{tot,initial}$$

It should be noted that the portion of liquid that must be drained for the measurement is a small part of the total content (~15%), since the majority of the liquid remains inside the ORC circuit in known volumes. The combination of all possible measurement errors (such as the accuracy of the temperature probes and of the level meter) is of the order of 0.1%. Even if at least an embodiment was described in the brief and detailed description, it is to be intended that there exist many other variants in the protection scope of the invention. Further, it is to be intended that said embodiment or embodiments described are only example and do not limit in any way the protection scope of the invention and its application or configurations. The brief and detailed description give instead the experts in the field a convenient guide to implement at least an embodiment, while it is to be intended that many variations of the function and elements assembly here described can be made without departing from the protection scope of the invention encompassed by the appended claims and/or technical/legal equivalents thereof.

REFERENCE NUMBERS 1 evaporator
2 turbine
3 condenser
4 pump
5 preheater
6 storage tank
7 collection well
8 process piping
9 drainage pump
10 drainage circuit
11 inlet valves
12 valve by-pass of the turbine
13 drain valves of air-cooled condensers (ACC)
ACC air condensers
LT1 and LT2 LT3 LT4 dedicated level sensors
Δm mass variation
Mtot total mass
Vck volume used to drain the process media from "sampled"
Vckd volume used to contain the portion of the fluid "championship"
Vc control volume or the sampling
Vc' volume of liquid remaining in the volume Vc
n number of emptying cycles of Vc

The invention claimed is:

1. A method for the calculation of the working fluid loss in an organic Rankine cycle plant, comprising at least one evaporator, a preheater, a turbine, a condenser, a pump, a collecting well and a process piping, wherein said working fluid, when the plant is stopped, is in part present in known volumes inside the plant and partly drained in at least a storage tank comprising at least three rooms or volumes:
   a first volume for storing the fluid to be measured,
   a second volume having a restricted section for measuring the volume of fluid stored in said first volume,
   a third volume containing the portion of the fluid already measured, said method being characterized by the fact that the working fluid loss of the plant is calculated as the difference between the fluid amount measured in two different instants of time.

2. The method according to claim 1, wherein said plant is realized by the following phases:
   a) activation of a bypass of the hot spring
   b) activation of a bypass of the turbine
   c) filling of the preheater and the evaporator up to a known level, stopping of the pump and closing a shut-off valve downstream of the pump
   d) opening of the exhaust manifolds of the drain valves of the air condensers for the drainage of the liquid in the volume of the tank storage.

3. The method according to claim 2 wherein said step b) further comprises the ramp reduction of the pump load until the normal plant stop in a time not exceeding 30 min.

4. The method according to claim 2, wherein said step c) is characterized by the simultaneous closing of the by-pass of the turbine and the inlet valves.

5. The method according to claim 2, wherein said step c) further comprises the achievement of balance between the working fluid and the ambient temperature in a time not exceeding 30 min.

6. The method according to claim 2, wherein said step c) of pump stopping and the closing of the shut-off valve downstream of the pump take place in a time not exceeding 60 min.

7. The method according to claim 1, wherein a level sensor is positioned downstream of said evaporator in a calibrated section and it constitutes a first set point of the liquid level inside the plant.

8. The method according to claim 1, wherein a level sensor is positioned in the collection sump and constitutes a second set point of the liquid level within the system.

9. The method according to claim 1, wherein said working fluid, drained in said at least one storage tank, undergoes the following further steps:
   a) displacement of the fluid from the first volume to the second volume with a restricted section,
   b) displacement of the fluid from the second volume within the third volume
   c) repetition for a predetermined number of times of the phases a) and b).

10. The method according to claim 9, wherein said working fluid inside the storage tank is moved by means of a drainage pump.

11. The method according to claim 1, wherein a level sensor is positioned in the storage tank for measuring the liquid level in the second volume.

12. The method according to claim 1, wherein said total amount of working fluid is equal to the sum of the working fluid contained in known volumes inside the plant and of the tested in the storage tank, the latter according to the formula:

$$n \times Vc + Vc'$$

where: n=number of fills in the second volume Vc
Vc'=residual volume of fluid inside the second volume Vc.

13. The method according to claim 12, wherein said total amount of the working fluid present in the known volume is measured or calculated multiplying the volumes for the respective density, obtained as a function of the recorded temperature.

14. A plant in an organic Rankine cycle, comprising at least one evaporator, a turbine, a condenser, a pump, a preheater, a collecting well, a piping process and a storage tank configured for applying the method according to claim 1.

* * * * *